United States Patent
Li et al.

(10) Patent No.: US 8,970,057 B2
(45) Date of Patent: Mar. 3, 2015

(54) METHOD OF OPERATING A WIND TURBINE, WIND TURBINE, WIND TURBINE CONTROLLING SYSTEM, AND PROCESSING SYSTEM

(75) Inventors: Bing Li, Singapore (SG); Anshuman Tripathi, Singapore (SG); Shu Yu Cao, Singapore (SG); Amit Kumar Gupta, Singapore (SG); Eng Kian Kenneth Sng, Aarhus N. (DK); Lars Helle, Suldrup (DK)

(73) Assignee: Vestas Wind Systems A/S, Aarhus N (DK)

( * ) Notice: Subject to any disclaimer, the term of this patent is extended or adjusted under 35 U.S.C. 154(b) by 161 days.

(21) Appl. No.: 13/638,546

(22) PCT Filed: Mar. 23, 2011

(86) PCT No.: PCT/DK2011/050095
§ 371 (c)(1),
(2), (4) Date: Apr. 12, 2013

(87) PCT Pub. No.: WO2011/120523
PCT Pub. Date: Oct. 6, 2011

(65) Prior Publication Data
US 2013/0187384 A1    Jul. 25, 2013

(30) Foreign Application Priority Data
Mar. 31, 2010 (DK) ................................. 2010 00272

(51) Int. Cl.
*B60L 11/02*    (2006.01)
*B61C 9/38*    (2006.01)
(Continued)

(52) U.S. Cl.
CPC .................. *F03D 9/003* (2013.01); *H02J 3/386* (2013.01); *Y02E 10/72* (2013.01); *Y02E 10/763* (2013.01)
USPC .................................. 290/45; 290/44; 322/20

(58) Field of Classification Search
CPC ............... H02J 3/386; H02J 3/16; H02J 3/18; Y02E 10/763; Y02E 40/34; Y02E 40/30; Y02E 10/563; Y02E 60/60; H02P 2009/004; F03D 9/003; F03D 7/046; F03D 9/005; H02M 1/42; Y02B 70/12
USPC ......................................... 290/44, 45; 322/20
See application file for complete search history.

(56) References Cited

U.S. PATENT DOCUMENTS 5,270,913 A * 12/1993 Limpaecher .................. 363/140
5,357,419 A * 10/1994 Limpaecher .................. 363/140
(Continued)

FOREIGN PATENT DOCUMENTS

| | | |
|---|---|---|
| EP | 1508951 A1 | 2/2005 |
| EP | 2066017 A1 | 6/2009 |
| WO | 2004098261 A2 | 11/2004 |

OTHER PUBLICATIONS

International Search Report and Written Opinion dated Jan. 9, 2012 for International Application No. PCT/DK2011/050095, 10 pages.

(Continued)

*Primary Examiner* — Pedro J Cuevas
(74) *Attorney, Agent, or Firm* — Patterson + Sheridan, LLP

(57) ABSTRACT

According to an embodiment, a method of operating a wind turbine comprising a DC-to-AC voltage converter is provided, the wind turbine being connectable to a grid via the DC-to-AC voltage converter, the method comprising: determining a line voltage of a power line connecting the DC-to-AC voltage converter to the grid; if the determined line voltage exceeds a predefined voltage threshold value, injecting reactive current into the power line, wherein the amount of reactive current injected is chosen such that an output voltage of the DC-to-AC voltage converter is kept within a predetermined voltage range.

20 Claims, 8 Drawing Sheets

(51) Int. Cl.
*H02J 3/38* (2006.01)
*F03D 9/00* (2006.01)

(56) References Cited

U.S. PATENT DOCUMENTS

| | | | | |
|---|---|---|---|---|
| 5,561,597 A * | 10/1996 | Limpaecher | | 363/59 |
| 5,764,501 A * | 6/1998 | Limpaecher | | 363/61 |
| 5,798,631 A | 8/1998 | Spee et al. | | 322/25 |
| 6,566,764 B2 * | 5/2003 | Rebsdorf et al. | | 290/44 |
| 6,856,038 B2 * | 2/2005 | Rebsdorf et al. | | 290/44 |
| 7,638,983 B2 * | 12/2009 | Park et al. | | 322/20 |
| 8,120,932 B2 * | 2/2012 | Folts et al. | | 363/37 |
| 8,310,214 B2 * | 11/2012 | Garces Rivera et al. | | 323/207 |
| 8,615,331 B2 * | 12/2013 | Garcia | | 700/287 |
| 8,693,228 B2 * | 4/2014 | Matan et al. | | 363/97 |
| 8,796,872 B2 * | 8/2014 | Arinaga et al. | | 290/44 |
| 8,823,191 B2 * | 9/2014 | Andresen et al. | | 290/44 |
| 8,854,015 B2 * | 10/2014 | Deng | | 322/27 |
| 8,860,236 B2 * | 10/2014 | Nasiri | | 290/44 |
| 2002/0079706 A1 * | 6/2002 | Rebsdorf et al. | | 290/55 |
| 2004/0026929 A1 * | 2/2004 | Rebsdorf et al. | | 290/44 |
| 2007/0097565 A1 | 5/2007 | Oohara et al. | | 361/20 |
| 2007/0121354 A1 | 5/2007 | Jones et al. | | 363/47 |
| 2008/0007121 A1 | 1/2008 | Erdman et al. | | 307/47 |
| 2008/0265577 A1 | 10/2008 | Fortmann et al. | | 290/44 |
| 2008/0303489 A1 * | 12/2008 | Park et al. | | 322/20 |
| 2008/0315685 A1 | 12/2008 | Mandalakas et al. | | 307/46 |
| 2010/0002475 A1 * | 1/2010 | Folts et al. | | 363/37 |
| 2010/0208501 A1 * | 8/2010 | Matan et al. | | 363/95 |
| 2011/0215652 A1 * | 9/2011 | Gengenbach et al. | | 307/87 |
| 2011/0216562 A1 * | 9/2011 | Gengenbach | | 363/71 |
| 2011/0317460 A1 * | 12/2011 | Garces Rivera et al. | | 363/127 |
| 2012/0056602 A1 * | 3/2012 | Li et al. | | 322/89 |
| 2012/0112713 A1 * | 5/2012 | Kuehn | | 323/207 |
| 2013/0010505 A1 * | 1/2013 | Bo et al. | | 363/37 |
| 2013/0082636 A1 * | 4/2013 | Ohori et al. | | 318/723 |
| 2013/0176762 A1 * | 7/2013 | Seymour et al. | | 363/132 |
| 2014/0001759 A1 * | 1/2014 | Gupta et al. | | 290/44 |
| 2014/0008912 A1 * | 1/2014 | Gupta et al. | | 290/44 |
| 2014/0145508 A1 * | 5/2014 | Wagoner | | 307/72 |
| 2014/0254223 A1 * | 9/2014 | Limpaecher | | 363/126 |

OTHER PUBLICATIONS

Danish Search Report dated Nov. 3, 2010, for DK Application No. PA 2010 00272, 1 page.

* cited by examiner

METHOD OF OPERATING A WIND TURBINE, WIND TURBINE, WIND TURBINE CONTROLLING SYSTEM, AND PROCESSING SYSTEM

The present invention relates generally to a method of operating a wind turbine, a wind turbine, a wind turbine controlling system, and a processing system usable for operating a wind turbine.

With the rapid increase of large offshore wind farms, a new problem associated with the response of wind turbines to temporary overvoltages has arisen: The majority of wind turbines use voltage source converters with a DC-link. When the grid voltage exceeds a certain voltage limit, the current flow through the line-side converter of the wind turbine may reverse, resulting in a rapidly increasing DC-link voltage.

One possibility to handle such situations is to interrupt the connection between the wind turbine and the grid. However, it is desirable to keep the wind turbines connected to the grid even under such circumstances. Thus, different approaches are currently under investigation which enable to keep the wind turbines connected to the grid during temporary overvoltages, while at the same time avoiding rapidly increasing DC-link voltages.

SUMMARY OF THE INVENTION

According to an embodiment, a method of operating a wind turbine comprising a DC-to-AC voltage converter is provided, the wind turbine being connectable to a grid via the DC-to-AC voltage converter, the method comprising: determining a line voltage of a power line connected between the DC-to-AC voltage converter and the grid; if the determined line voltage exceeds a particular grid voltage threshold value, directly injecting reactive current into the power line, wherein the amount of reactive current injected is chosen such that an output voltage of the DC-to-AC voltage converter is kept within a predetermined voltage range.

According to an embodiment, the line voltage is determined using a phase lock loop algorithm.

According to an embodiment, a reactive current reference is calculated based on a maximum output voltage of the DC-to-AC voltage converter, the line voltage, and an active current reference.

According to an embodiment, the active current reference is derived from a DC link controller output.

According to an embodiment, the reactive current reference is calculated according to the following formula:

$$I_R \leq (\sqrt{m^2 \cdot U_{max}^2 - (U_{GD} - \omega L \cdot I_A)^2} - U_{GQ})/\omega L$$

wherein $U_{GD}$, $U_{GQ}$ are the line voltages of the power line along the d/q axis in dq frame, and $I_A$, $I_R$ are the active and reactive currents, m is the maximum allowed modulation index and $U_{max}$ is the maximum allowed converter output voltage $\vec{U}_v$. Further, L is the inductance of an inductor (commonly known as "grid inductor" or "grid choke"), and $\omega$ is the voltage frequency. $I_R$ calculated in the above equation has a negative value. Thus, the minimum reactive current may be chosen (in terms of amplitude) if $I_R$ is set equal to the right term of the equation. Since a maximum current Imax is fixed, this will leave more space for injection of active current $I_A$. Thus, $I_R$ should preferably be equal to the right term of the equation. According to an embodiment, the reactive current reference is converted into an optimized reactive current reference if a converter output current reference amplitude calculated from the active current reference and the reactive current reference exceeds a predetermined converter output current reference amplitude threshold value.

According to an embodiment, the active current reference is converted into an optimized active current reference if a converter output current reference amplitude calculated from the active current reference and the reactive current reference exceeds a predetermined converter output current reference amplitude threshold value.

According to an embodiment, the converter output current reference amplitude is determined according to the following formula:

$$I_{ref} = \sqrt{I_{r\_ref\_cal}^2 + I_{a\_ref\_cal}^2}$$

According to an embodiment, the optimized active current reference/reactive current reference are calculated based on the following formula:

$$\begin{cases} I_R = \left(\dfrac{m^2 \cdot U_{max}^2}{\omega^2 L^2} - I_{max}^2\right) \cdot \dfrac{\omega L}{2 \cdot U_{GQ}} - \dfrac{U_{GQ}}{2 \cdot \omega L} \\ I_A = \sqrt{I_{max}^2 - I_R^2} \end{cases}$$

According to an embodiment, the converter output current is controlled based on the optimized active current reference and the optimized reactive current reference. That is, the amount of reactive current injected is controlled based on the optimized reactive current reference, and the amount of active current injected is controlled based on the optimized active current reference. One effect of this embodiment is that the converter output voltage is kept within Umax, and the converter output current is kept within Imax. A further effect of this embodiment is that, at the same time, the maximum possible active power can be injected into the grid.

According to an embodiment, a processing system usable for operating a wind turbine comprising a DC-to-AC voltage converter is provided, the wind turbine being connectable to a grid via the DC-to-AC voltage converter, the processing system comprising: an input unit being configured to receive a line voltage signal indicating the line voltage of a power line connected between the DC-to-AC voltage converter and the grid; a processing unit coupled to the input unit, the processing unit being configured to determine whether the line voltage exceeds a particular line voltage threshold value, and to determine an amount of reactive current which, if directly injected into the power line, keeps an output voltage of the DC-to-AC voltage converter within a predetermined voltage range; and an output unit coupled to the processing unit, the output unit being configured to output a signal indicative of the reactive current to be directly injected into the power line.

According to an embodiment, the input unit is further configured to receive an active current reference signal, wherein the processing unit is configured to calculate a reactive current reference indicative of the reactive current to be injected based on a maximum output voltage of the DC-to-AC voltage converter, the line voltage signal, and the active current reference signal, wherein the output signal outputted by the output unit is derived by the processing unit from the reactive current reference.

According to an embodiment, the processing unit is further configured to convert the reactive current reference into an optimized reactive current reference if a converter output current reference amplitude calculated from the active current reference and the reactive current reference exceeds a predetermined converter output current reference amplitude threshold value, wherein the output signal outputted by the output unit is derived by the processing unit from the optimized reactive current reference.

According to an embodiment, the processing unit is configured to convert the active current reference into an optimized active current reference if a converter output current reference amplitude calculated from the active current reference and the reactive current reference exceeds a predetermined converter output current reference amplitude threshold value, wherein the output signal outputted by the output unit is derived by the processing unit from the optimized active current reference.

According to an embodiment, a wind turbine controlling system for controlling a wind turbine comprising a DC-to-AC voltage converter is provided, the wind turbine being connected to a grid via the DC-to-AC voltage converter, the controlling system comprising a processing system according to any one of the embodiments as described above.

According to an embodiment, the wind turbine controlling system further comprises a phase lock loop unit being coupled to the input unit of the processing system, the phase lock loop unit being configured to determine the line voltage signal using a phase lock loop algorithm, and to supply it to the input unit.

According to an embodiment, the wind turbine controlling system further comprises a DC link controller unit coupled to the input unit of the processing system, wherein the DC link controller unit is configured to control a DC link voltage according to a DC link voltage reference level (the DC link controller unit controls the DC link voltage so that it is always kept at a reference voltage; the DC link controller does this by injecting an appropriate active current), and to output the active current reference signal which is supplied to the input unit.

According to an embodiment, the wind turbine controlling system further comprises a converter output current controlling unit coupled to the output unit of the processing system, wherein the converter output current controlling unit is configured to control the converter output current based on the active current reference and the reactive current reference, or based on the optimized active current reference and the optimized reactive current reference.

According to an embodiment, a wind turbine comprising a wind turbine controlling system according to any one of the embodiments as described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
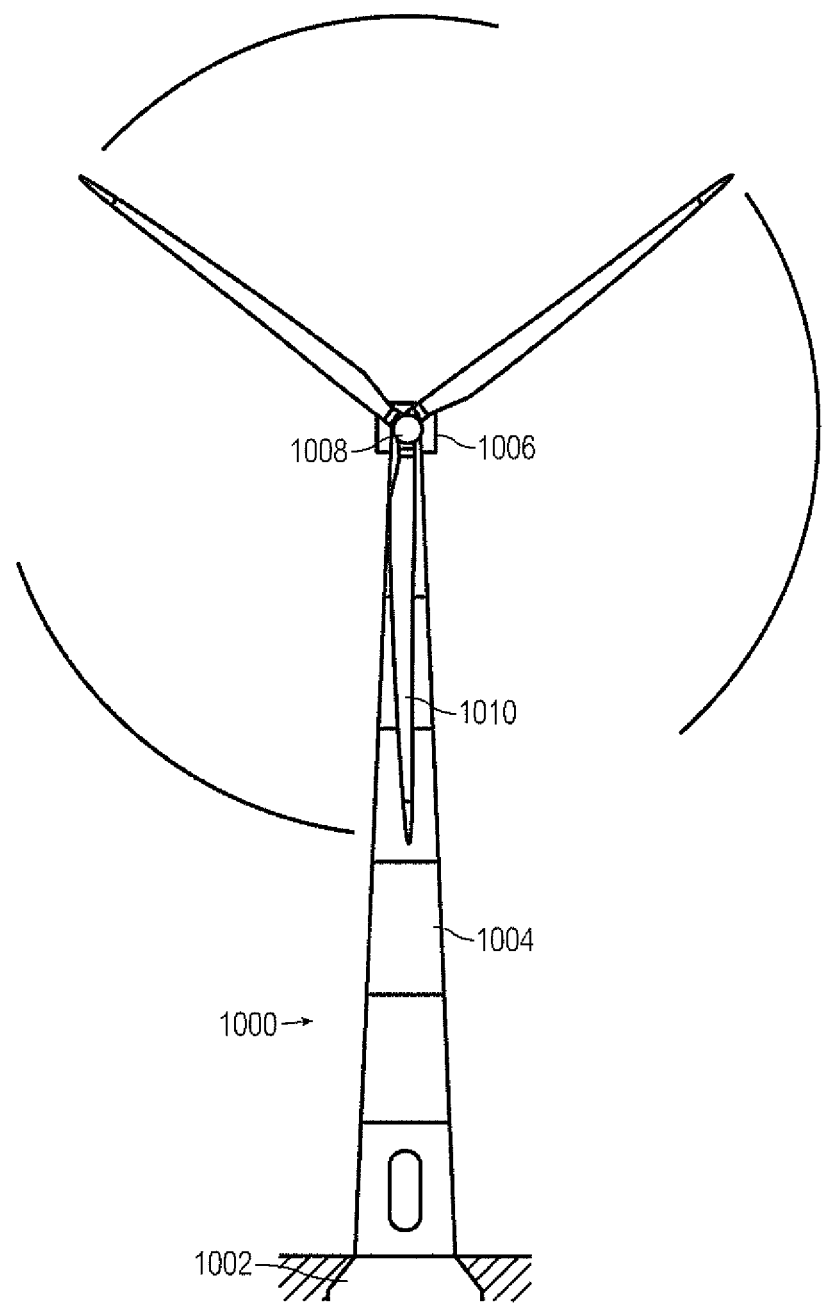
FIG. 1 shows a schematic drawing of a wind turbine according to an embodiment of the present invention.

FIG. 1 illustrates a common setup of a wind turbine 1000 according to one embodiment of the present invention. The wind turbine 1000 is mounted on a base 1002. The wind turbine 1000 includes a tower 1004 having a number of towers sections, such as tower rings. A wind turbine nacelle 1006 is placed on top of the tower 1004. The wind turbine rotor 1008 includes at least one rotor blade 1010, e.g. three rotor blades 1010. The rotor blades 1010 are connected to the nacelle 1006 through a low speed shaft which extends out of the front of the nacelle 1006. In the wind turbine 1000 (e.g. within the nacelle 1006), an electrical system may be used which will be described in the following).

Figure 2A:
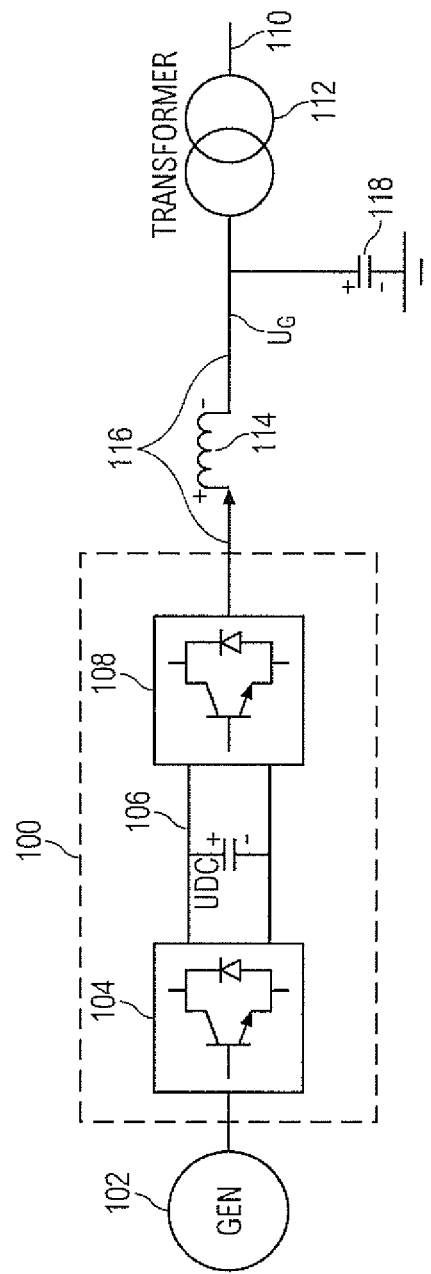
FIG. 2a shows a schematic drawing of an electrical system having a full scale converter configuration.

FIG. 2a shows an electrical system 100 of a wind turbine having a converter configuration which may be used in a wind turbine according to embodiments of the present invention. The electrical system 100 is connected to a generator 102 of a wind turbine. The electrical system 100 comprises an AC-to-DC voltage converter 104 (generator-side converter) connected to the generator 102, a DC-to-AC converter 108 (line-side converter) and a DC link 106 connected between the AC-to-DC converter 104 and the DC-to-AC converter 108. The DC-to-AC converter 108 is connected via a power line 116 to a transformer 112 which in turn is connected to a power grid 110. An inductor 114 is located along the power line 116. The power line 116 is further connected to a capacitor 118. The electrical system 100, the generator 102 and the transformer 112 may be part of a wind turbine as shown in FIG. 1, and are typically located within the nacelle of the wind turbine. The converter configuration of the electrical system 100 is a full scale converter configuration. "Full scale" in this context means that the full power generated by a generator 102 is converted by the DC-to-AC voltage converter 108 before being supplied to the grid 110. The DC-to-AC voltage converter 108 has a maximum converter output voltage ($U_{max}$) that it can produce based on a fixed DC link voltage and also has a converter output current limit that cannot be exceeded. If the converter current output limit is exceeded, the wind turbine may trip. That is, when there is a HV (high voltage) event on the power line 116 (also referred to as "voltage swell" event), the converter output voltage of the DC-to-AC converter 108 may exceed the maximum converter output voltage $U_{max}$ of the DC-to-AC converter 108. As a result, this may cause a converter output current to exceed the converter output current limit of the DC-to-AC converter 108. This may cause the wind turbine to trip, resulting in the wind turbine being disconnected from the grid 110.

In other words: In case the grid voltage of the power grid 110 exceeds for example beyond 1 p.u. (p.u.="per unit", i.e. a ratio of voltage/normal voltage), the DC-to-AC converter 108 (line-side converter) of the wind turbine is required to adjust a line current vector such that the required converter output voltage of the DC-to-AC converter 108 can be kept below the maximum converter output voltage $U_{max}$ and the converter output current does not exceed the converter output current limit of the DC-to-AC converter 108. In grid swell condition, since the maximum output voltage $U_{max}$ of the DC-to-AC converter 108 is limited by the DC-link voltage $U_{DC}$, the converter output current $I_G$ may become uncontrollable. Also, in a grid swell condition, a significant overshoot of the DC-link voltage $U_{DC}$ may occur which may lead to an activation of a chopper (not shown) for the dissipation of unknown/uncontrolled power transfer to the grid 110. In order to avoid such uncontrollable situations, countries like Australia have stipulated High Voltage Ride Through (HVRT) requirements for wind turbines to withstand an over-voltage of 1.3 p.u. for 60 ms without being disconnected.

The grid voltage on the grid 110 (high voltage side of the transformer 112) is correlated to the line voltage of the power line 116 (low voltage side of the transformer 112) by the transformer ratio. Thus, in the present invention, the terms "line voltage" and "grid voltage" may be used interchangeably.

However, the situation may be kept under control if reactive power is injected into the power line 116 connected between the DC-to-AC converter 108 and the transformer 112 (and thus into the power grid 110) by adjusting the required output voltage of the DC-to-AC converter 108, as will become apparent in the description below.

Figure 3:
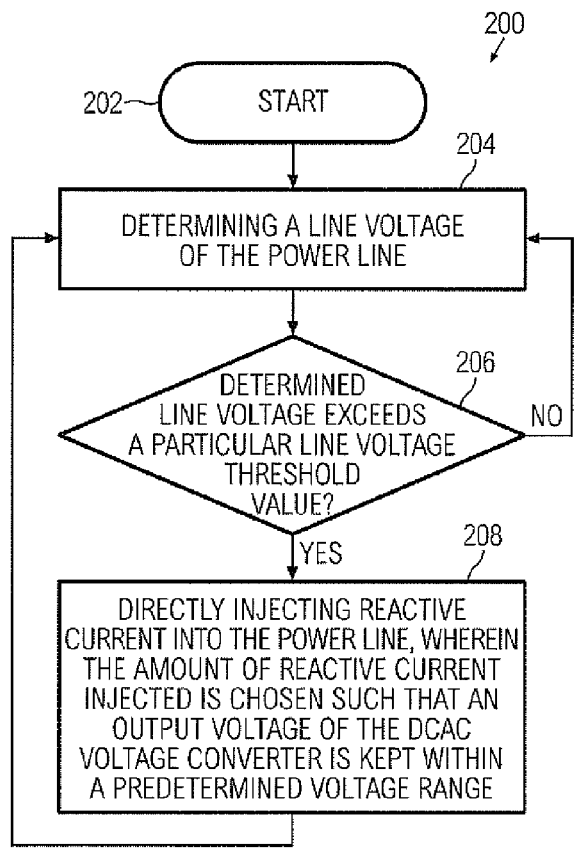
FIG. 3 shows a flow chart diagram of a method of operating a wind turbine according to an embodiment of the present invention.

FIG. 3 shows a flow chart of a method 200 of controlling a wind turbine according to an embodiment of the present invention. At 202, the method is started. At 204, the line voltage of the power line is determined. At 206, it is determined whether the line voltage exceeds a predefined threshold value. If the predefined threshold value is not exceeded, the flow returns to 204. If the predefined threshold value is exceeded, the flow continues with 208 at which reactive current is directly injected into the power line, wherein the amount of reactive current injected is chosen such that an output voltage of the DC-to-AC converter is kept within a predetermined voltage range. Then, the flow returns to 204.

In the context of FIG. 2a, the method shown in FIG. 3 may be interpreted in a way that in case of HV events on the power line 116, a calculated amount of reactive current is injected into the power line 116. This injection is done by adjusting the converter output voltage of the DC-to-AC converter 108 such that the resulting converter output current $I_G$ comprises the calculated amount of reactive current. By controlling the amount of the reactive current injected, the amplitude of the converter output voltage $U_v$ can be kept below the maximum converter output voltage $U_{max}$, and maximum possible active power can be injected into the power line 116 (and thus into the grid 110). As a result, the wind turbine will not trip, and can therefore remain connected to the grid 110 in HV events. HVRT (high voltage ride through) refers to this capability of the wind turbine to remain connected to the grid 110 during such a HV event.

In the following description, a theoretical background for embodiments of the present invention will be given.

Figure 2B:
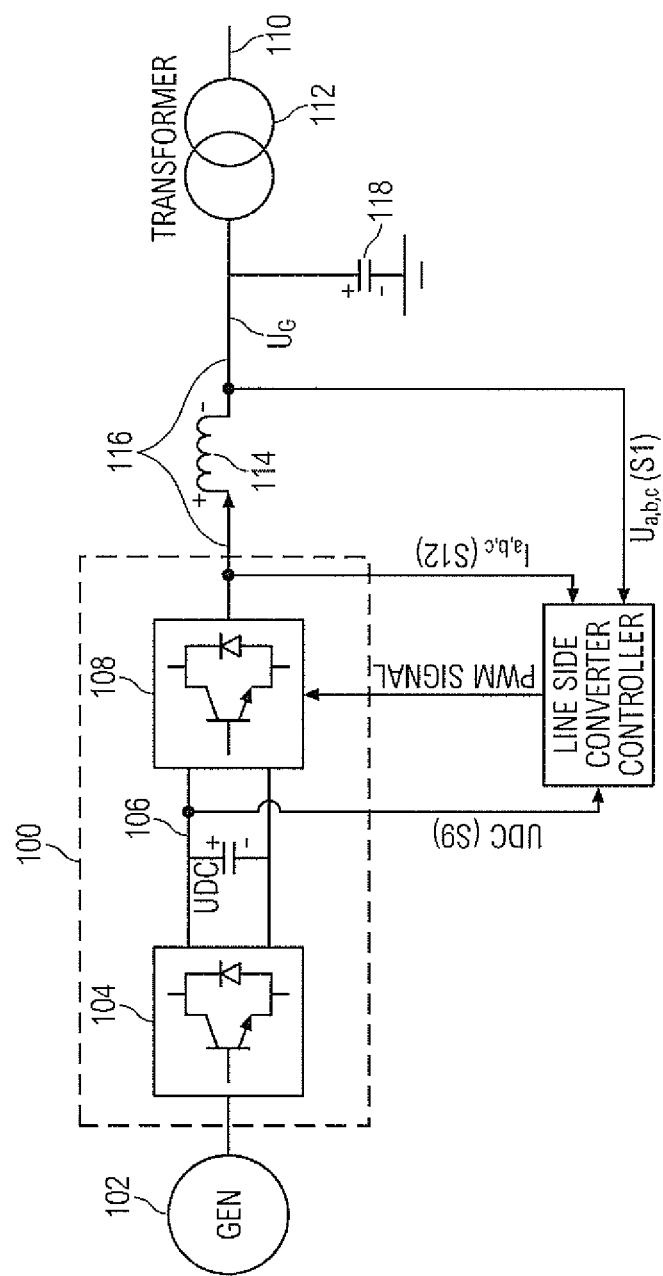
FIG. 2b shows a schematic drawing of an electrical system having a full scale converter configuration according to an embodiment of the present invention.

The output voltage of the DC-to-AC converter 108 in FIG. 2 may be represented by the following voltage equation:

$$\vec{U}_v = \vec{U}_G + \vec{U}_L = \vec{U}_G + j\omega L \vec{I}_G$$

wherein $\vec{U}_v$ is the converter output voltage of the DC-to-AC converter 108, $\vec{U}_G$ is a line voltage at a part of the power line 116 close to the low voltage end of the transformer 112, $\vec{U}_L$ is the voltage drop across the inductor 114, and $\vec{I}_G$ is the output current of the DC-to-AC converter 108. Further, L is the inductance of the inductor 114, and $\omega$ is the voltage frequency.

Figure 6:
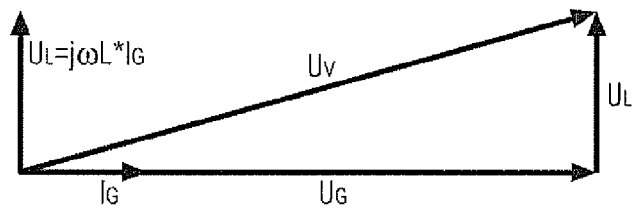
FIG. 6 shows a schematic phasor diagram which may occur when carrying out a method of operating a wind turbine according to an embodiment of the present invention.

In case of a "healthy" grid (power line) (in a case where there is no grid swell and where the line voltage $\vec{U}_G$ is within its normal line voltage range), the converter output current $\vec{I}_G$ is aligned with the line voltage $\vec{U}_G$ as illustrated in the phasor diagram of FIG. 6. That is, only active power is injected into the power line 116, but no reactive power.

Figure 7:
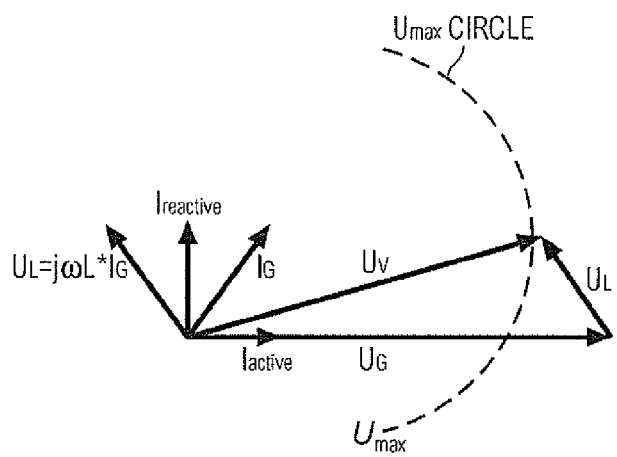
FIG. 7 shows a schematic phasor diagram which may occur when carrying out a method of operating a wind turbine according to an embodiment of the present invention.

Under the grid voltage swell condition, according to an embodiment of the present invention, the converter output current $\vec{I}_G$ is controlled in such a way that the amplitude of converter output voltage $\vec{U}_v$ is limited at or below a maximum converter output voltage amplitude $U_{max}$. The phase of converter output current $\vec{I}_G$ leads the phase of the line voltage $\vec{U}_G$ and it can be projected into reactive current $I_{reactive}$ and active current $I_{active}$ as shown in the phasor diagram of FIG. 7.

Figure 8:
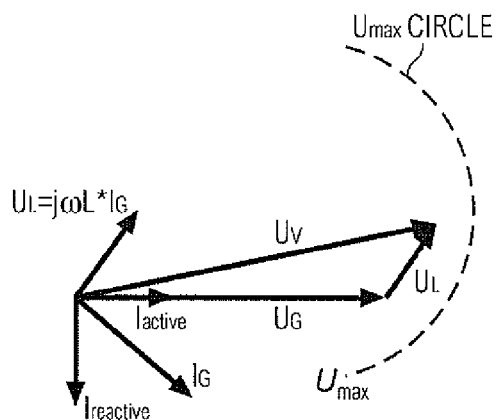
FIG. 8 shows a schematic phasor diagram which may occur when carrying out a method of operating a wind turbine according to an embodiment of the present invention.

It should be noted that in the case of grid voltage dip (LV (low voltage) events), reactive (capacitive) current is also normally required by grid operators to be injected into the grid 110 to help in stabilizing the grid 110. In the case of LV event, the converter output voltage amplitude is always below the limit $U_{max}$. The phasor diagram as shown in FIG. 8 illustrates this.

The following equations can be derived from a DQ frame model of line current control.

$$\begin{cases} L\dfrac{dI_R}{dt} = U_{VD} - U_{GD} + \omega L I_A \\ L\dfrac{dI_A}{dt} = U_{VQ} - U_{GQ} - \omega L I_R \end{cases}$$

wherein $U_{VD}$, $U_{VQ}$ are the converter output voltages along the d/q axis in the dq frame, $U_{GD}$, $U_{GQ}$ are the line voltages along the d/q axis in dq frame, and $I_A$, $I_R$ are the active and reactive currents. Further, L is the inductance of the inductor 114, and $\omega$ is the voltage frequency.

In the steady state condition, the converter output voltage $\vec{U}_v$ can be calculated as below $$\begin{cases} U_{VD} = U_{GD} - \omega L I_A \\ U_{VQ} = U_{GQ} + \omega L I_R \end{cases}$$

The following expression can be used based on the converter voltage limit, $$U_{VD}^2 + U_{VQ}^2 = (U_{GD} - \omega L I_A)^2 + (U_{GQ} + \omega L I_R)^2 \leq (m \cdot U_{max})^2 \quad (1)$$

wherein "m" is the maximum allowed modulation index and $U_{max}$ is the maximum allowed converter output voltage $\vec{U}_v$.

Using the equations given above, under the steady state condition, the required reactive current for the HVRT condition can be derived as follows $$I_R \leq (\sqrt{m^2 \cdot U_{max}^2 - (U_{GD} - \omega L \cdot I_A)^2} - U_{GQ})/\omega L \quad (2)$$

Figure 4:
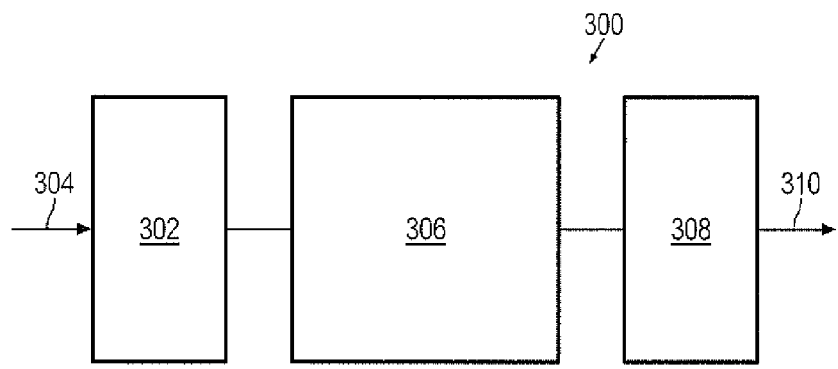
FIG. 4 shows a schematic block diagram of a processing system usable for operating a wind turbine according to an embodiment of the present invention.

FIG. 4 shows a processing system 300 usable for operating a wind turbine according to one embodiment of the present invention. The processing system 300 comprises: an input unit 302 being configured to receive a line voltage signal 304 indicating the line voltage of the power line; a processing unit 306 coupled to the input unit 302, the processing unit 306 being configured to determine whether the line voltage exceeds a predetermined threshold value, and to determine an amount of reactive current which, if directly injected into the power line, keeps an output voltage of the DC-to-AC voltage converter within a predetermined voltage range; and an output unit 308 coupled to the processing unit 306, the output unit 308 being configured to output a signal 310 indicative of the reactive current to be directly injected into the power line. The output signal 310 may be generated based on formula (2).

Figure 5:
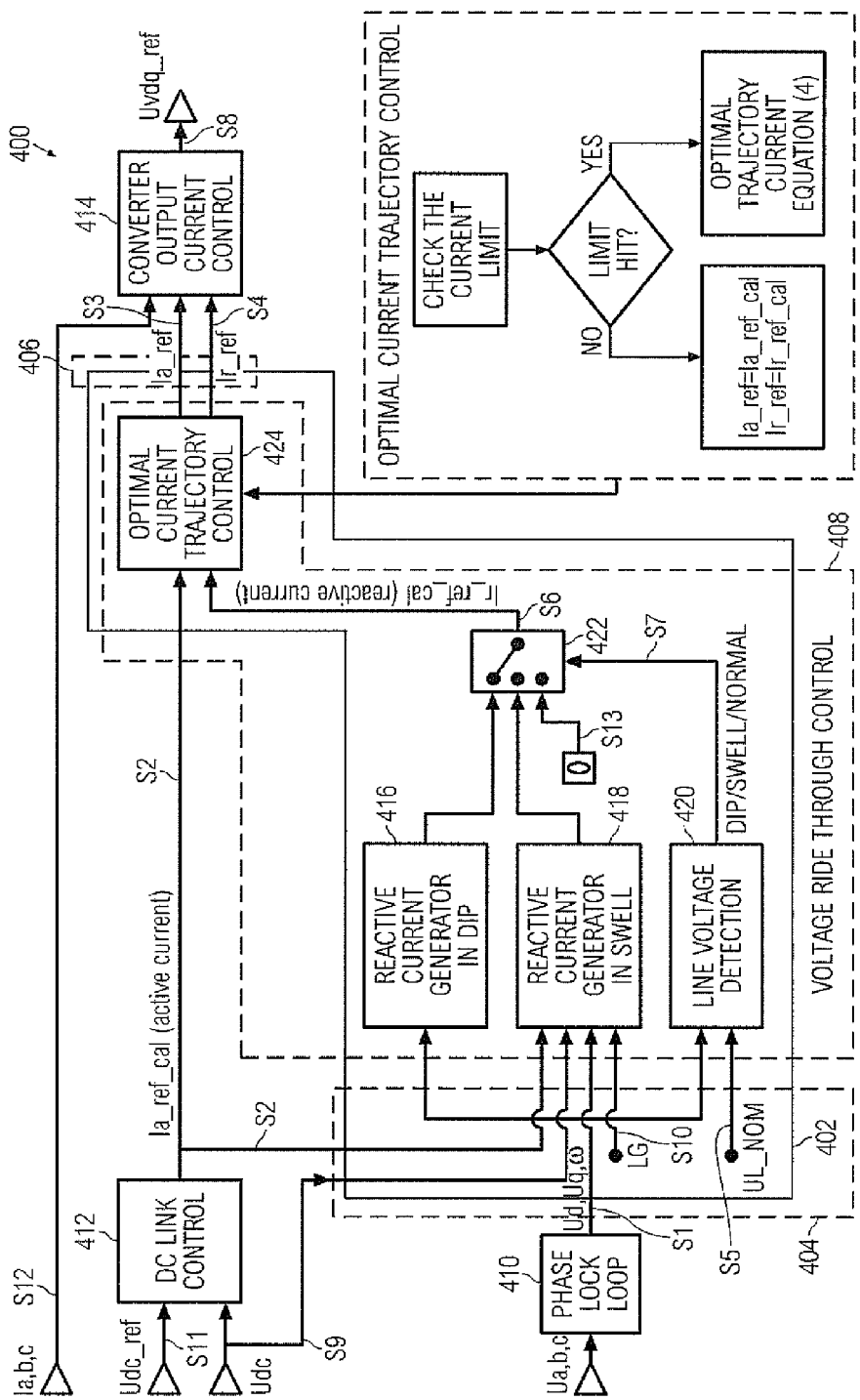
FIG. 5 shows a schematic block diagram of a controlling system usable for operating a wind turbine according to an embodiment of the present invention.

FIG. 5 shows a possible realization of the processing system 300 shown in FIG. 4. In FIG. 5, a block diagram of a converter controller system 400 for controlling the DC-to-AC converter 108 is shown. Part 402 of the converter controller system 400 (ride through functionality system) may be regarded as a concrete embodiment of the processing system 300. Part 402 comprises functionality needed to handle HV events (HVRT functionality) as well as functionality needed to handle LV events (LVRT functionality).

The voltage ride through functionality system 402 comprises an input unit 404, an output unit 406 and a processing unit 408.

The input unit 404 is coupled to a phase lock loop unit 410 being configured to generate a line voltage signal S1 indicative of the d,q components of the line voltage of the power line 116 using a phase lock loop algorithm, and to supply the line voltage signal S1 to the input unit 404.

The input unit 404 is further coupled to a DC link controller unit 412 being configured to generate an active current reference signal S2, and to supply the active current reference signal S2 to the input unit 404.

The output unit 406 is coupled to a converter output current controlling unit 414 being configured to control the converter output current based on an active current reference signal S3 and an reactive current reference signal S4. The active current reference signal S3 may be an optimized active current reference signal, and the reactive current reference signal S4 may be an optimized reactive current reference signal.

The processing unit 408 comprises a first reactive current generator unit 416, a second reactive current generator unit 418, a line voltage classifying unit 420, a switching unit 422, and a current optimizing unit 424.

Based on a nominal line voltage signal S5, the line voltage classifying unit 420 classifies the line voltage into three categories—normal, dip or swell.

Figure 12:
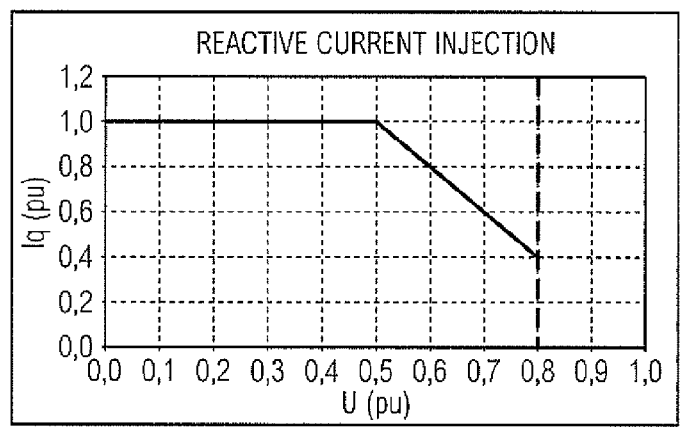
FIG. 12 shows an example of the amount of reactive current to be injected as required by a grid code in case of a low voltage event in the grid.

Depending on the line voltage category determined, a reactive current reference signal S6 is generated by either the first reactive current generator unit 416 (in case of a dip condition) based on information as shown in FIG. 12 (FIG. 12 provides information specifying the amount of reactive current to be injected as required by a grid code in case of a low voltage event in the power line), or from the second reactive current generator unit 418 (in case of a swell condition) based on equation (2). The switching unit 422 is controlled by an output signal S7 generated by the line voltage classifying unit 420 such that the reactive current reference signal S6 is calculated from the correct one of the first reactive current generator unit 416 and the second reactive current generator unit 418, depending on the line voltage. Using the active current reference signal S2 and the reactive current reference signal S6, the line current controlling unit 414 generates a converter output voltage reference signal S8 based on which the converter output voltage $\vec{U}_v$ is controlled accordingly. In order to do this, a controller of the DC-to-AC converter 108 may for example generate PWM signals based on the converter output voltage reference signal S8, thereby controlling the DC-to-AC converter 108 to adjust the converter output voltage $\vec{U}_v$ such that the converter output current adopts its target value. This is exemplary shown in FIG. 2b: The line voltage signal S1, signal S9 and signal S12 (and maybe also further signals) are supplied to the converter controller system 400, based on which the converter controller system 400 determines the converter output voltage reference signal S8. The converter output voltage reference signal S8 is used to generate PWM signals for controlling the DC-to-AC converter 108 such that the converter output current adopts its target value.

Signal S9 is a measured DC link voltage signal (measured at the DC link 106, signal S10 is an inductance input parameter (a parameter indicating the inductance of the inductor 114), signal S11 is a DC link voltage target value, and signal S12 is a measured converter output current signal of the converter 108.

In the case that a voltage dip condition is detected by the line voltage classifying unit 420, the reactive current reference signal S6 is calculated by the first reactive current generator unit 416 based on the percentage of the dip according to a grid code as shown in FIG. 12.

The current optimizing unit 424 (optimal current trajectory control block) is optional and works as follows. A converter output current reference amplitude is computed by the current optimizing unit 424 from the reactive current reference signal S6 and the active current reference signal S2, and is compared with a converter output current reference amplitude limit $I_{max}$. If the converter output current reference amplitude is less than $I_{max}$, an active current reference signal S3 and a reactive current reference signal S4 are set as following:

$$\begin{bmatrix} I_{r\_ref} \\ I_{a\_ref} \end{bmatrix} = \begin{bmatrix} I_{r\_ref\_cal} \\ I_{a\_ref\_cal} \end{bmatrix} \text{ if } \sqrt{I_{r\_ref\_cal}^2 + I_{a\_ref\_cal}^2} \leq I_{max}$$

That is, in this case, the active current reference signal S3 corresponds to the active current reference signal S2, and the reactive current reference signal S4 corresponds to the reactive current reference signal S6.

However, if the current reference amplitude exceeds the maximum limit $I_{max}$, an optimization process is applied. The optimization process is carried out as follows: Optimized current references (signals S3, S4) are determined using equation (1) as follows:

$$\begin{cases} (U_{GD} - \omega L I_A)^2 + (U_{GQ} + \omega L I_R)^2 \leq m^2 \cdot U_{max}^2 \\ I_A^2 + I_R^2 = I_{max}^2 \end{cases}$$

Since $U_{GD}$ is equal to zero in the steady state (this is because the rotation frame, the voltage is aligned with the Q axis in stable condition, and in vertical position to the D axis; $U_{GD}$ is the voltage that the line voltage is projected to D axis, so it is zero) in the current vector plane, the equations above can be written as following:

$$\begin{cases} \left(I_R + \dfrac{U_{GQ}}{\omega L}\right)^2 + (I_A)^2 \leq \dfrac{m^2 \cdot U_{max}^2}{\omega^2 L^2} \\ I_R^2 + I_A^2 = I_{max}^2 \end{cases} \quad (3)$$

By solving the above equations (3), the following optimal current references (signals S3, S4) are obtained:

$$\begin{cases} I_R = \left(\dfrac{m^2 \cdot U_{max}^2}{\omega^2 L^2} - I_{max}^2\right) \cdot \dfrac{\omega L}{2 \cdot U_{GQ}} - \dfrac{U_{GQ}}{2 \cdot \omega L} \\ I_A = \sqrt{I_{max}^2 - I_R^2} \end{cases} \quad (4)$$

That is, if the converter output current reference amplitude exceeds the maximum limit $I_{max}$, the signals S3, S4 are obtained from signals S2, S6 using equations (4).

Figure 9:
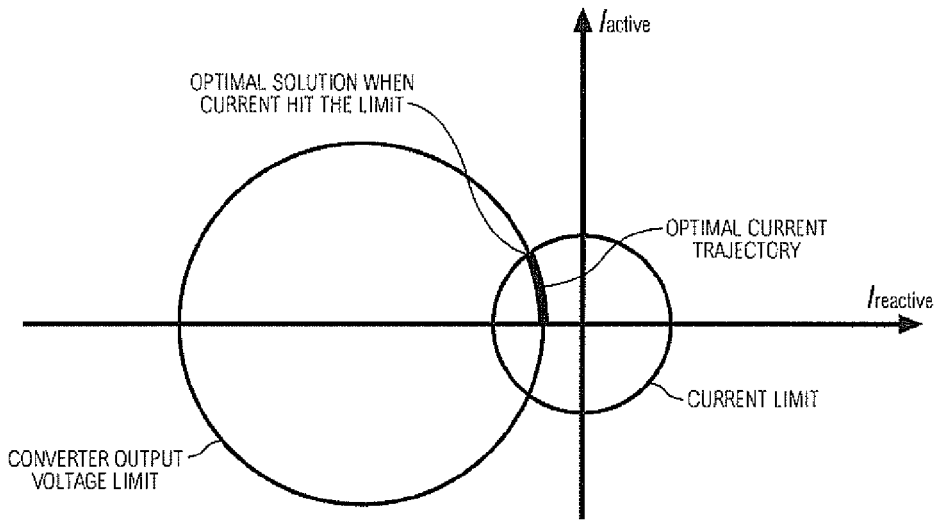
FIG. 9 shows a schematic current diagram which may occur when carrying out a method of operating a wind turbine according to an embodiment of the present invention.

If the equations (4) are plotted in the current plane, the optimized solutions for active/reactive current references in line voltage swell condition can be visualized. This is shown in FIG. 9. Equations (4) to be understood that the currents Ir and Ia are completely recalculated according to equations (4), i.e. in this case the currents Ir and Ia are calculated without using signals S2 and S6.

FIG. 9 shows a current trajectory curve obtained after an optimization process based on equation (4).

This optimal current trajectory control ensures maximum active current and power output during HVRT while maintaining both the converter output current and converter output voltage within its limits.

Figure 10:
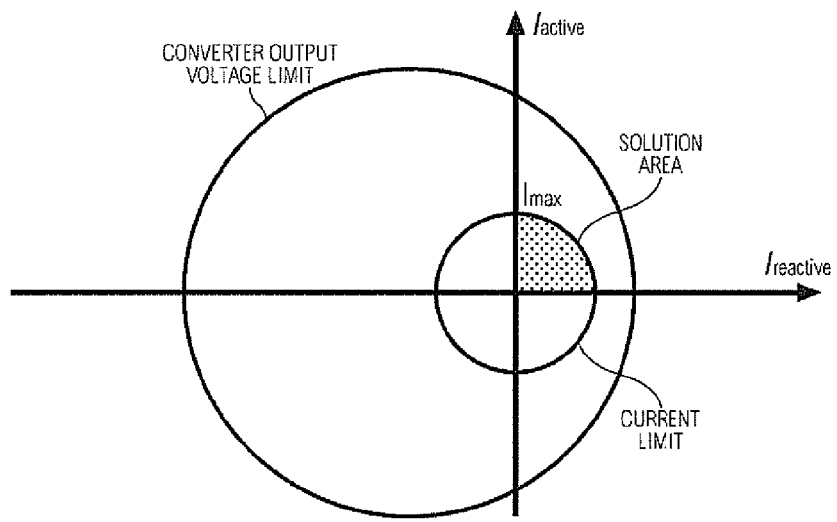
FIG. 10 shows a schematic current diagram which may occur when carrying out a method of operating a wind turbine according to an embodiment of the present invention.

In the condition of line voltage dip, the situation of FIG. 10 applies. In this case, since the converter circle contains the current circle, only current limit needs to be satisfied.

Figure 11:
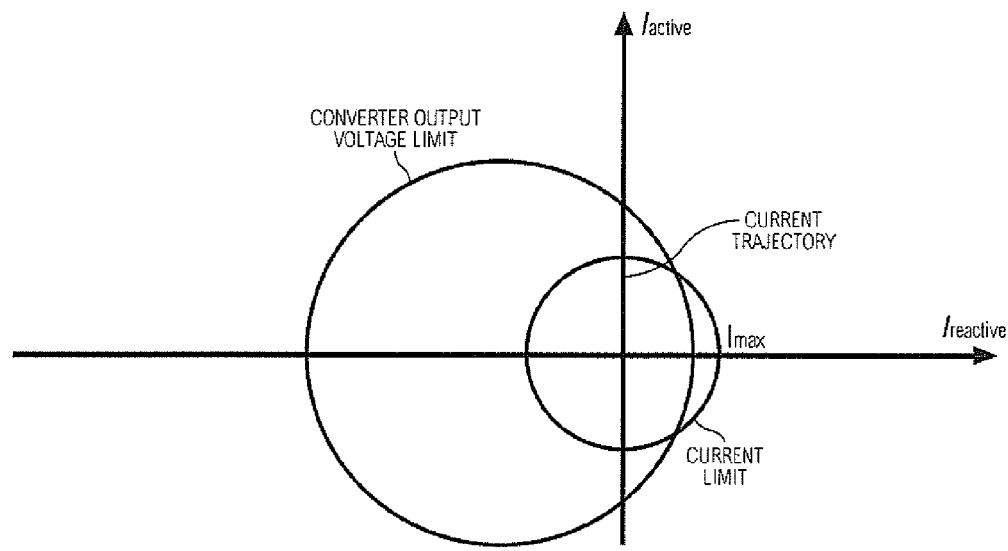
FIG. 11 shows a schematic current diagram which may occur when carrying out a method of operating a wind turbine according to an embodiment of the present invention.

FIG. 11 applies in the healthy line voltage condition (no reactive current injection needed). Since only active current is required to be injected to the power line, the current trajectory is only at the Y axis.

Based on the above description, it has become apparent that, according to an embodiment of the present invention, the following method is applied: 1) First, the active current (Ia_ref) and reactive current (Ir_ref) that need to be injected into the power line are determined. Ir_ref is determined using equation (2) and optimized, if necessary. 2) To cause the DC-to-AC converter 108 to output a converter output current $I_G$ which includes the respective active and reactive current components, the DC-to-AC converter 108 is controlled to output the necessary converter output voltage Uv. The control of the DC-to-AC converter 108 is done using PWM (Pulse Width Modulation) signals generated based on the signal S8 (i.e. the output signal from the converter output current control unit). 3) The PWM signals are used to control the operation of the DC-to-AC converter 108 such that it outputs the Uv (which is below Umax) together with a corresponding converter output current $I_G$ (comprising the corresponding Ia and Ir components determined) which is below the converter output current limit. Thus, first the reactive current to be injected into the power line 116 is determined such that Uv needed to generate the reactive current is below Umax. Then, the DC-to-AC converter 108 is controlled to have a voltage output Uv which will imply the converter output current $I_G$ with corresponding Ir component as determined earlier.

As has become apparent, embodiments of the present invention solve current and power control problems in case of a grid voltage swell.

According to embodiments of the present invention, by selecting a proper trajectory of current, the optimal active and reactive current can be injected such that the maximum active power can be transferred to the grid during HVRT.

According to embodiments of the present invention, the possibility of turbine tripping and chopper activation during a HVRT condition is minimized.

According to embodiments of the present invention, real and reactive power is controlled during voltage ride through condition.

According to embodiments of the present invention, by using an optimal trajectory current control, it is possible to provide the optimal active and reactive current injection so that the maximum active power can be transferred to the grid during HVRT.

According to embodiments of the present invention, a reactive current reference is computed, thereby minimizing the possibility of chopper activation. In HVRT condition with no activation of a chopper, the power is fed to the grid rather than being dissipated as heat into a chopper resistor.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of operating a wind turbine comprising a DC-to-AC voltage converter, the method comprising:
   determining a line voltage of a power line connecting the DC-to-AC voltage converter to a grid, the wind turbine being connectable to the grid via the DC-to-AC voltage converter, and
   if the determined line voltage exceeds a predefined voltage threshold value, injecting reactive current into the power line, wherein the amount of reactive current injected is chosen such that an output voltage of the DC-to-AC voltage converter is kept within a predetermined voltage range.

2. The method according to claim 1,
   wherein the line voltage is determined using a phase lock loop algorithm.

3. The method according to claim 1,
   wherein a reactive current reference is calculated based on a maximum output voltage of the DC-to-AC voltage converter, the line voltage, and an active current reference, wherein the amount of reactive current injected is controlled based on the reactive current reference.

4. The method according to claim 3,
wherein the active current reference is derived from a DC link controller output.

5. The method according to claim 3,
wherein the reactive current reference is calculated according to the following formula:

$$I_R \leq (\sqrt{m^2 \cdot U_{max}^2 - (U_{GD} - \omega L \cdot I_A)^2} - U_{GQ})/\omega L$$

wherein $U_{GD}$, $U_{GQ}$ are the line voltages along the d/q axis in the dq frame, $I_A$, $I_R$ are the active and reactive currents, m is the maximum allowed modulation index and $U_{max}$ is the maximum allowed converter output voltage, L is the inductance of an inductor at the power line, and w is the voltage frequency.

6. The method according to claim 3,
wherein the reactive current reference is converted into an optimized reactive current reference if a converter output current reference amplitude calculated from the active current reference and the reactive current reference exceeds a predetermined converter output current reference amplitude threshold value, wherein the amount of reactive current injected is controlled based on the optimized reactive current reference.

7. The method according to claim 3,
wherein the active current reference is converted into an optimized active current reference if a converter output current reference amplitude calculated from the active current reference and the reactive current reference exceeds a predetermined converter output current reference amplitude threshold value, wherein the amount of active current injected is controlled based on the optimized active current reference.

8. The method according to claim 6,
wherein the converter output current reference amplitude is determined according to the following formula:

$$I_{ref} = \sqrt{I_{r\_ref\_cal}^2 + I_{a\_ref\_cal}^2}$$

wherein $I_{r\_ref\_cal}$ is the reactive current reference, and $I_{a\_ref\_cal}$ is the active current reference.

9. The method according to claim 6,
wherein the optimized reactive current reference is calculated based on the following formula:

$$I_R = \left(\frac{m^2 \cdot U_{max}^2}{\omega^2 L^2} - I_{max}^2\right) \cdot \frac{\omega L}{2 \cdot U_{GQ}} - \frac{U_{GQ}}{2 \cdot \omega L}.$$

10. The method according to claim 9,
wherein the optimized active current reference is calculated based on the following formula:

$$I_A = \sqrt{I_{max}^2 - I_R^2}.$$

11. The method according to claim 10,
wherein the converter output current is controlled based on the optimized active current reference and the optimized reactive current reference.

12. A processing system usable for operating a wind turbine comprising a DC-to-AC voltage converter the processing system comprising:
an input unit being configured to receive a line voltage signal indicating the line voltage of a power line connecting the DC-to-AC voltage converter with a grid, the wind turbine being connectable to the grid via the DC-to-AC voltage converter,
a processing unit coupled to the input unit, the processing unit being configured to determine whether the line voltage exceeds a particular line voltage threshold value, and to determine an amount of reactive current which, if directly injected into the power line, keeps an output voltage of the DC-to-AC voltage converter within a predetermined voltage range, and
an output unit coupled to the processing unit, the output unit being configured to output an output signal indicative of the reactive current to be directly injected into the power line.

13. The processing system according to claim 12,
wherein the input unit is further configured to receive an active current reference signal, and wherein the processing unit is configured to calculate a reactive current reference indicative of the reactive current to be injected based on a maximum output voltage of the DC-to-AC voltage converter, the line voltage signal, and the active current reference signal, wherein the output signal outputted by the output unit is derived by the processing unit from the reactive current reference.

14. The processing system according to claim 13,
wherein the processing unit is further configured to convert the reactive current reference into an optimized reactive current reference if a converter output current reference amplitude calculated from the active current reference and the reactive current reference exceeds a predetermined converter output current reference amplitude threshold value, wherein the output signal outputted by the output unit is derived by the processing unit from the optimized reactive current reference.

15. The processing system according to claim 13,
wherein the processing unit is configured to convert the active current reference into an optimized active current reference if a converter output current reference amplitude calculated from the active current reference and the reactive current reference exceeds a predetermined converter output current reference amplitude threshold value, wherein the output signal outputted by the output unit is derived by the processing unit from the optimized active current reference.

16. A wind turbine controlling system for controlling a wind turbine comprising a DC-to-AC voltage converter, the controlling system comprising a processing system comprising:
an input unit being configured to receive a line voltage signal indicating the line voltage of a power line connecting the DC-to-AC voltage converter with a grid, the wind turbine being connectable to the grid via the DC-to-AC voltage converter,
a processing unit coupled to the input unit, the processing unit being configured to determine whether the line voltage exceeds a particular line voltage threshold value, and to determine an amount of reactive current which, if directly injected into the power line, keeps an output voltage of the DC-to-AC voltage converter within a predetermined voltage range, and
an output unit coupled to the processing unit, the output unit being configured to output an output signal indicative of the reactive current to be directly injected into the power line.

17. The wind turbine controlling system according to claim 16,
further comprising a phase lock loop unit being coupled to the input unit of the processing system, the phase lock loop unit being configured to determine the line voltage signal using a phase lock algorithm, and to supply it to the input unit.

18. The wind turbine controlling system according to claim 16,
further comprising a DC link controller unit coupled to the input unit of the processing system, wherein the DC link controller unit is configured to control a DC link voltage according to a DC link voltage reference level, and to output the active current reference signal which is supplied to the input unit.

19. The wind turbine controlling system according to claim 16,
further comprising a converter output current controlling unit coupled to the output unit of the processing system, wherein the converter output current controlling unit is configured to control the converter output current based on the active current reference and the reactive current reference, or based on the optimized active current reference and the optimized reactive current reference.

20. A system, comprising:
a wind turbine comprising a DC-to-AC voltage converter; and
a controlling system for controlling the wind turbine, the controlling system comprising a processing system comprising:
an input unit being configured to receive a line voltage signal indicating the line voltage of a power line connecting the DC-to-AC voltage converter with a grid, the wind turbine being connectable to the grid via the DC-to-AC voltage converter,
a processing unit coupled to the input unit, the processing unit being configured to determine whether the line voltage exceeds a particular line voltage threshold value, and to determine an amount of reactive current which, if directly injected into the power line, keeps an output voltage of the DC-to-AC voltage converter within a predetermined voltage range, and
an output unit coupled to the processing unit, the output unit being configured to output an output signal indicative of the reactive current to be directly injected into the power line.

* * * * *